United States Patent
Liu et al.

(10) Patent No.: US 7,558,487 B2
(45) Date of Patent: Jul. 7, 2009

(54) MULTILEVEL AMPLITUDE AND PHASE ENCODED SIGNAL GENERATION

(75) Inventors: Xiang Liu, Marlboro, NJ (US); Xing Wei, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 635 days.

(21) Appl. No.: 11/162,830

(22) Filed: Sep. 25, 2005

(65) Prior Publication Data

US 2007/0071453 A1    Mar. 29, 2007

(51) Int. Cl.
*H04B 10/04*    (2006.01)

(52) U.S. Cl. .................. 398/185; 398/186; 398/188

(58) Field of Classification Search ............. 398/185, 398/186, 188
See application file for complete search history.

(56) References Cited

U.S. PATENT DOCUMENTS

| | | | |
|---|---|---|---|
| 2003/0095311 A1* | 5/2003 | Liu et al. | 359/135 |
| 2004/0021829 A1* | 2/2004 | Griffin | 353/30 |
| 2007/0009269 A1* | 1/2007 | Zitelli | 398/188 |

* cited by examiner

*Primary Examiner*—Christina Y Leung

(57) ABSTRACT

A method and apparatus for generating multilevel amplitude and phase encoded signals using a pair of 1:N beam splitter/combiner(s) having a pre-defined splitting distribution and an array of zero-biased, Mach-Zehnder Modulators configured for phase modulation.

11 Claims, 5 Drawing Sheets

1(a) 1(b)

US 7,558,487 B2

MULTILEVEL AMPLITUDE AND PHASE ENCODED SIGNAL GENERATION

FIELD OF THE INVENTION

The present invention relates generally to the field of photonics and in particular to methods and apparatus for generating multilevel amplitude and phase encoded signal(s).

BACKGROUND OF THE INVENTION

High performance optical communications systems require transmitters capable of modulating both the amplitude and phase of an optical signal having a high data rate with multi-level precision. In addition, optical modulation formats used for such high performance systems must provide high spectral efficiency, data-rate agility and high receiver sensitivity.

A 16-state modulation format based upon differential quadrature-phase-shift keying (DQPSK) and a 4-level pulse amplitude modulation format (PAM4) has been recently demonstrated. (See, e.g., K. Sekine et al., *Proposal And Demonstration Of 10-G symbol/sec, 16-ary (40 Gb/s) Optical Modulation/Demodulation Scheme*," which appeared in Proceedings of European Conference on Optical Communication (ECOC'04), paper We3.4.5, 2004). As is known, the DQPSK-PAM4 format encodes data at 4 bits/symbol and is typically realized by driving a single Mach-Zehnder Modulator (MZM) with a 4-level electronic signal, which in turn is produced by power-combing two signal tributaries of different amplitudes. Unfortunately, this DQPSK-PAM4 scheme exhibits a number of infirmities.

More specifically, and in addition to being overly complex, this scheme results in a less-than-optimal amplitude spacing for the PAM4 modulation since the transfer function of the MZM is pre-determined and cannot be used to produce an optimal spacing (or constellation). Additionally, to approach the optimal spacing, the saturation regime of the MZM transfer function cannot be reached, thereby resulting in additional optical loss and a larger inter-symbol interference (ISI) with a limited modulator bandwidth. Finally, the generation of the multi-level RF signal causes higher ISI in the RF domain and the amplification of the multi-level RF signal requires an amplifier having a large bandwidth and high linearity, which is much harder to implement than a saturating amplifier that is commonly used for binary modulation.

SUMMARY OF THE INVENTION

We have developed a method and accompanying apparatus that produces a superior constellation of multilevel phase and amplitude modulated signals and does not suffer from the deficiencies associated with the prior art. Advantageously, our inventive method and apparatus employs an optical splitter/combiner pair—which exhibits preferable splitting ratio(s)—and an array of Mach-Zehnder Modulators configured for phase modulation.

BRIEF DESCRIPTION OF THE DRAWING

A more complete understanding of the present invention may be realized by reference to the accompanying drawing in which.

DETAILED DESCRIPTION

Figure 1:
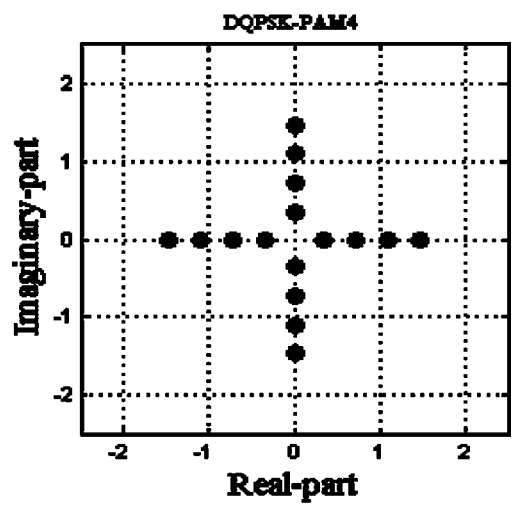
FIGS. 1(*a*) and 1(*b*) are constellation diagrams of DQPSK-PAM4 and DQPSK+PAM8 formats, respectively wherein signal average power is normalized to unity.
Figure 1:
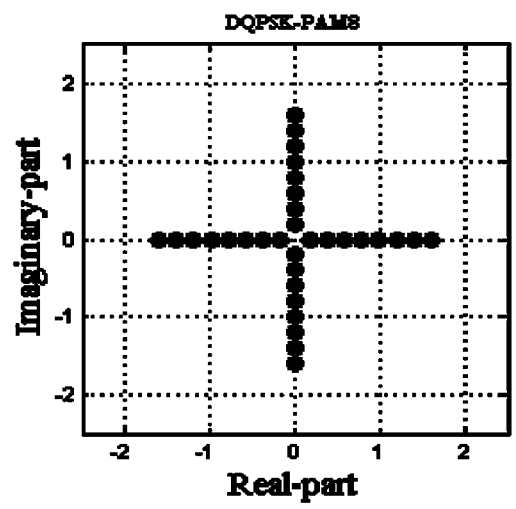

With initial simultaneous reference to FIG. 1(*a*) and FIG. 1(*b*), there is shown preferred constellation diagrams for DQPSK-PAM4 and DQPSK-PAM8 formats, respectively. As is known, such constellation diagrams are representations of digital modulation scheme(s) in a complex plane. By convention, the real and imaginary axis are oftentimes called the in-phase or I-axis and the quadrature or Q-axis, respectively.

With continued reference to FIG. 1(*a*) and FIG. 1(*b*), preferred relative amplitudes of the PAM levels for the DQPSK-PAM2N format(s) are approximately:

$$C \cdot (0.9 + [0\ 1\ 2\ \ldots\ 2^N - 1])$$

where C is a normalizing factor. Note that the "amplitude" here refers to the amplitude in the field domain, which is the square root of intensity. The optimal value 0.9 for the lowest amplitude level is determined from the bit-error rate (BER) estimation with random Gaussian noise in the optical field.

A preferred constellation of a multilevel signal may be determined by substantially equalizing the performance of all of the tributaries comprising the signal. As can be appreciated all of the symbols in a PAM constellation may be reached by the summation and subtraction among the following N terms, namely $C \cdot 2^{N-2}, C \cdot 2^{N-3}, \ldots C \cdot 2^{-1}$, on top of the averaged term, $C \cdot (0.4 + 2^{N-1})$.

For example, the 8-PAM levels of the DQPSK-PAM8 format, 0.9+[0 1 2 3 4 5 6 7], can be reached by 4.4±2±1±0.5. More specifically, a first data tributary can be encoded by the most significant modulation arm which provides the (±2) component, a second data tributary can be encoded by the second most significant modulation arm which provides the (±1) component, and the last data tributary can be encoded by the least significant modulation arm which provides the (±0.5) component. Note that an appropriate pre-coding can be used so that received signal tributaries can be independently recovered. Without modulating the least significant tributary or tributaries, the overall data rate of the generated multilevel signal will be reduced, but the signal will be more immune to noise. This provides a flexibility of data-rate agile transmission, in which the overall signal data-rate can be varied depending on the quality of the transmission link, e.g., the worse the link quality, the lower the data rate to ensure acceptable transmission performance. This data-rate agile transmission can be readily realized with the invention.

Figure 2:
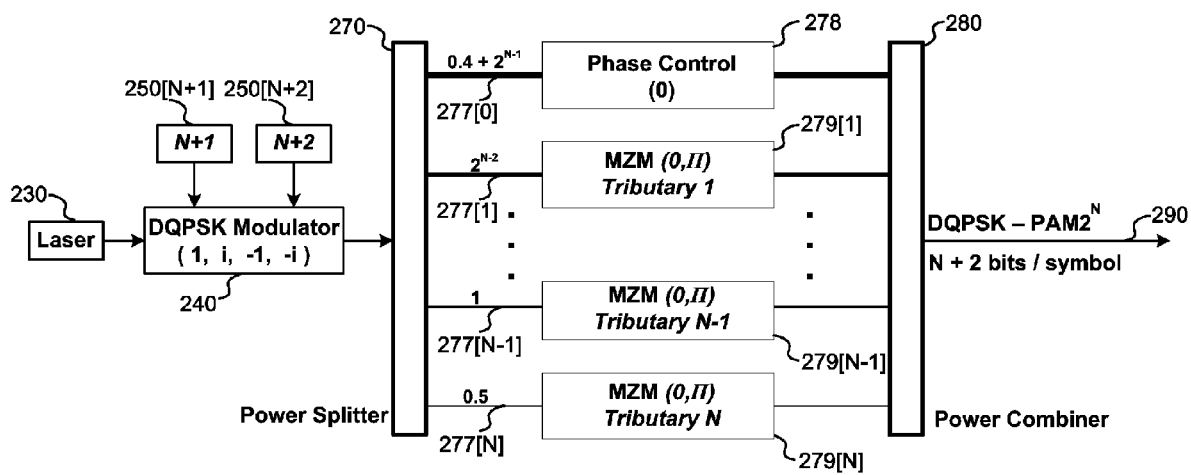
FIG. 2 is a schematic of a modulator apparatus for modulating DQPSK-PAM2N signals according to the present invention.

With reference now to FIG. 2 there is shown a schematic of a modulator for the DQPSK-PAM2N format, incorporating the teachings of the present invention. More particularly, laser 230 is followed by a DPQSK Modulator 240, whose output of is split through the effect of power splitter 270.

As can be seen from this FIG. 2, the power splitter 270 includes N+1 output arms, 277[0], . . . , 277[N], which exhibit split power distributions of $(0.4+2^{N+1})$, $(2^{N-2})$, $(2^{N-3})$, (1), (0.5), respectively. Consequently, and as can be readily appreciated by those skilled in the art, when modulated laser light output by modulator 240 is presented to the power splitter 270, it is split into a number of signals, the number being equal to the number of individual output arms. As indicated earlier, each of the split signals exhibits a different power which, according to the present exemplary embodiment, is $(0.4+2^{N-1})$, $(2^{N-2})$, $(2^{N-3})$, ..., (1), and (0.5) for each of the output arms 277[0], ..., 277[N], respectively.

In this regard, our inventive structure employs two, "unequal splitters", namely, the power splitter 270 and a power combiner 280. For the DQPSK-PAM$2^N$ format shown and described here, we use two, 1:(1+N) splitters, wherein one of the arms is not modulated. As we shall describe later, our inventive structure(s) may be extended to the QAM-$2^N$ format with quadrature modulation in addition to the in-phase modulation described herein.

Continuing with our discussion of this preferred embodiment for the generation of a DQPSK-PAM$2^N$ format, the output arm indicated by reference 277[0], which has a power of $(0.4+2^{N-1})$, is un-modulated. A phase control unit 278 is used to ensure that the reference is aligned in phase with the modulated signals. Each of the other output arms 277[1], ..., 277[N], includes a Mach-Zehnder Modulator 278[1], ..., 278[N], biased at null, to act as a phase modulator. The optical signal(s) traversing each of the individual output arms 277[1], ..., 277[N], and its respective, null biased MZM 278[1], ..., 278[N], may be either unchanged, or changed by exactly π, by modulating the individual MZM with a signal tributary, thereby realizing the "summation" and "subtraction" functions that are required to reach all of the symbol states.

The optical signals output from each of the MZM 278[1], ..., 278[N] positioned in a respective output arm 277[1], ..., 277[N], are recombined into a common signal through the effect of power combiner 280. The power combiner 280, is a mirror image of the power splitter 270, having the same splitting ratio(s). The output of the power combiner 280, is combined, DQPSK-PAM$2^N$ formatted signal, having (N+2) bits/symbol.

Note that since the signal optical power is proportional to the square of the signal optical field amplitude, the cascaded use of the beam splitter and combiner having the same splitting ratios produces desired signal power levels.

Figure 3:
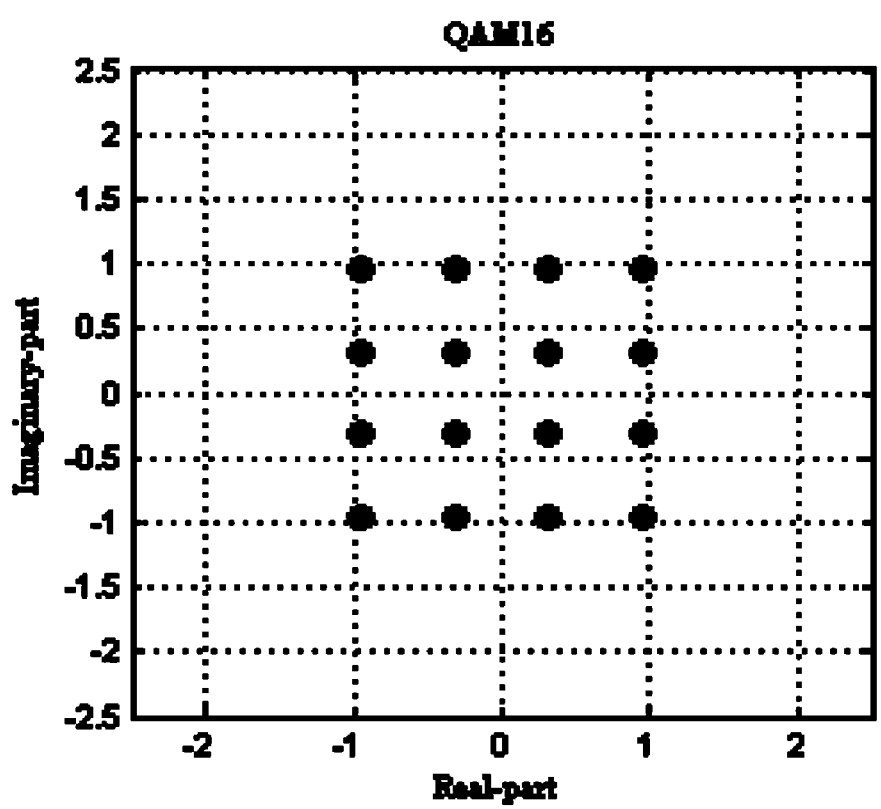
FIG. 3 is a constellation diagram of a QAM16 signal wherein signal average power is normalized to unity.

With these inventive teachings in place, we can extend our invention to quarature-amplitude modulation (QAM). Referring now to FIG. 3, there is shown a constellation diagram for a QAM16 signal. As is shown in that FIG. 3, the average power of the signal is normalized to unity.

Figure 4:
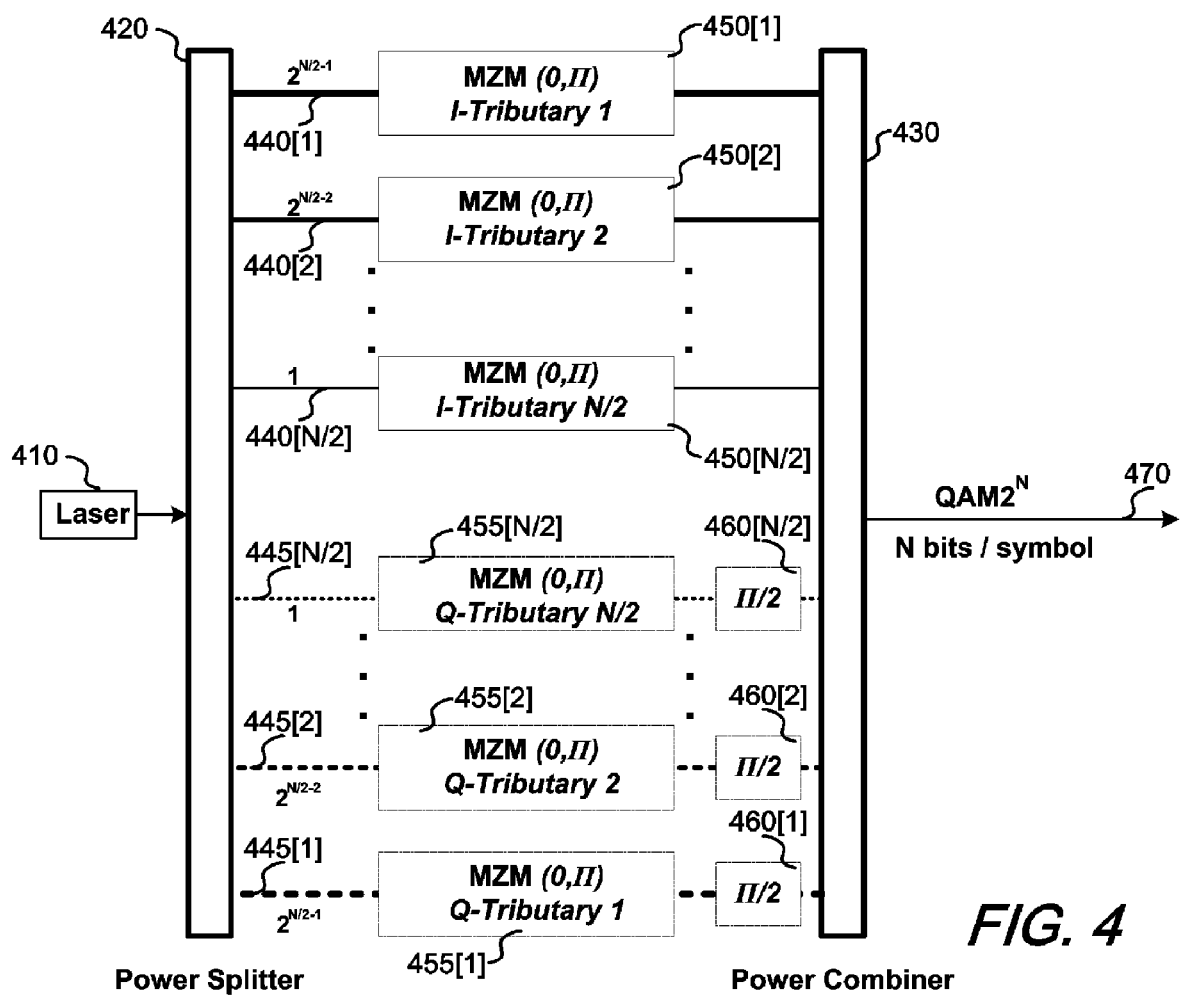
FIG. 4 is a schematic of a modulator apparatus for modulating QAM2N signals according to the present invention.
Figure 5:
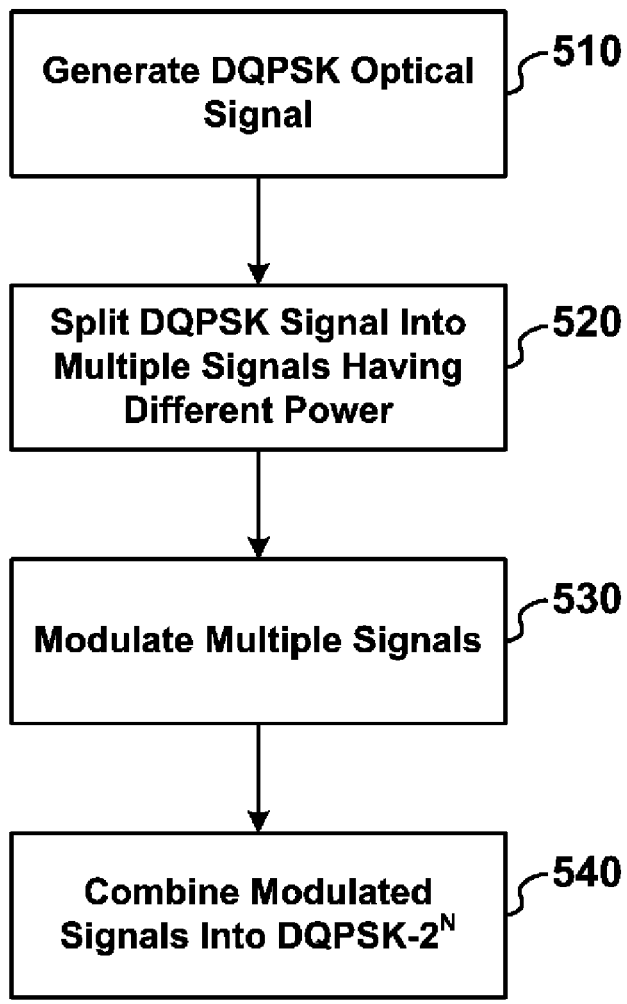
FIG. 5 is a flowchart depicting our inventive method.

With reference now to FIG. 4, there is shown a schematic of a QAM2N modulator constructed according to our inventive teachings. To produce a QAM2N signal, there are a total of N arms interconnecting power splitter 420 and power combiner 430, namely 440[1], ..., 440[N/2] and 445[1], ..., 445[N/2].

As can be seen in this FIG. 4, N/2 of the arms (440[1], ..., 440[N/2] are for the in-phase(I) tributaries and the other N/2 arms (445[1], ..., 445[N/2]) are for the quadrature (Q) tributaries. Accordingly, as light emanating from laser 410 is directed into power splitter 420, it is split into N separate signals, each traversing a separate output arm, 440[1], 440[N/2], and 445[1], ..., 445[N/2], and each having a particular power level effected by the power splitting distribution of the power splitter 420.

In this exemplary embodiment, the power splitting of the respective output arms is $2^{N/2-1}$, $2^{N/2-2}$, ..., 1 for in-phase arms 440[1], ..., 440[N/2], and $2^{N/2-1}$, $2^{N/2-2}$, ..., 1, for quadrature arms 445[1], ..., 445[N/2], respectively. Each signal traversing the arm(s) are modulated, through the effect of Mach-Zehnder Modulator(s) 450[1], ..., 450[N/2], and 455[1], ..., 455[N/2] configured for phase modulation and their respective tributary(ies). For the quadrature branches, 445[1], ..., 445[N/2], there is a π/2 phase offset 460[1], 460[N/2], between those quadrature branches and the in-phase branches 440[1], 440[N/2]. More specifically, the first I(Q) data tributary can be encoded by the most significant modulation arm which provides the $(\pm 2^{N/2-1})$ component, the second I(Q) data tributary can be encoded by the second most significant modulation arm which provides the $(\pm 2^{N/2-2})$ component, and the last I(Q) data tributary can be encoded by the least significant modulation arm which provides the (±1) component. Similar to the case with DQPSK+PAM signals, without modulating the least significant tributary or tributaries, the overall data rate of the generated QAM signal will be reduced to make the signal more immune to noise. This provides a flexibility of data-rate agile QAM transmission, in which the overall signal data-rate can be varied depending on the quality of the transmission link, e.g., the worse the link quality, the lower the data rate to ensure acceptable transmission performance.

The signals traversing the output branches are subsequently combined, through the action of power combiner 430 which, as before, mirrors the power-splitting of power splitter 420. Subsequently, a QAM$2^N$ signal, having N bits/symbol is output 470 from the power combiner 430.

As can now be appreciated, with our inventive design(s) shown and described, there is no modulator bandwidth-limitation induced optical phase pattern dependence since the MZMs used provides the exact changes in addition to the splitting ratio(s) being fixed. Additionally, and as we have shown, our inventive structures may be readily extended into alternative formats, such as the QAM$2^N$ format shown.

At this point, while we have discussed and described our invention using some specific examples, those skilled in the art will recognize that our teachings are not so limited. Accordingly, our invention should be only limited by the scope of the claims attached hereto.

What is claimed is:

1. A method for generating multilevel amplitude and phase encoded optical signals comprising the steps of:
   generating, a Differential Quaternary/Quadrature Phase Shift Keying (DQPSK) optical signal;
   splitting, the DQPSK optical signal into a number of optical signals, wherein each one of the number of optical signals exhibits a different optical power;
   modulating, at least one of the number of optical signals through the effect of a zero-biased, Mach-Zehnder Modulator configured for phase modulation; and
   combining, each one of the optical signals into a single DQPSK-PAM$2^N$ signal.

2. The method of claim 1, wherein the splitting step comprises the steps of:
   distributing, the optical signals into N+1 output arms of an optical splitter having a respective power splitting distribution of $(0.4+2^{N-1})$, $(2^{N-2})$, $(2^{N-3})$, ..., (1), (0.5).

3. The method of claim 1, further comprising the step of:
   selectively adjusting, the optical phase of the optical signals prior to their combining.

4. The method of claim 1, further comprising the step of:
   modulating, the MZM with a signal tributary.

5. The method of claim 4 wherein the phase of the optical signal is modulated by an amount approximately equal to π.

6. The method of claim 1, wherein the combining step comprises the steps of:
   receiving, the optical signals from N+1 output arms of an optical splitter having a respective power splitting distribution of $(0.4+2^{N+1})$, $(2^{N-2})$, $(2^{N-3})$, ..., (1), (0.5) through the effect of an optical combiner.

7. A method for generating multilevel amplitude and phase encoded optical signals comprising the steps of:
- generating an optical signal;
- splitting, the optical signal into a number of optical signals, wherein each one of the number of optical signals exhibits a different optical power;
- modulating, at least one of the number of optical signals through the effect of a zero-biased, Mach-Zehnder Modulator; and
- combining, each one of the optical signals into a single QAM2N signal.

8. The method of claim 7 wherein said splitting step splits the optical signal into N optical signals, wherein each one of the N optical signals exhibits a different optical power and each one of the N optical signals is associated with an in-phase tributary (I) or a quadrature (Q) tributary.

9. The method of claim 8 further comprising the step(s) of:
- applying, a phase offset of substantially $\pi/2$ to those signals associated with a quadrature (Q) tributary, with respect to those signals associated with an in-phase tributary.

10. The method of claim 7 wherein said modulating step comprises the step(s) of:
- applying, a tributary signal to the zero-biased, Mach-Zehnder Modulator.

11. The method of claim 7 further comprising the steps of:
- formatting, the QAM2N signals with return-to-zero pulse formatting.

* * * * *